A. C. ARNOLD & J. H. AIKEN.
Fulling-Mill.
No. 209,152.    Patented Oct. 22, 1878.
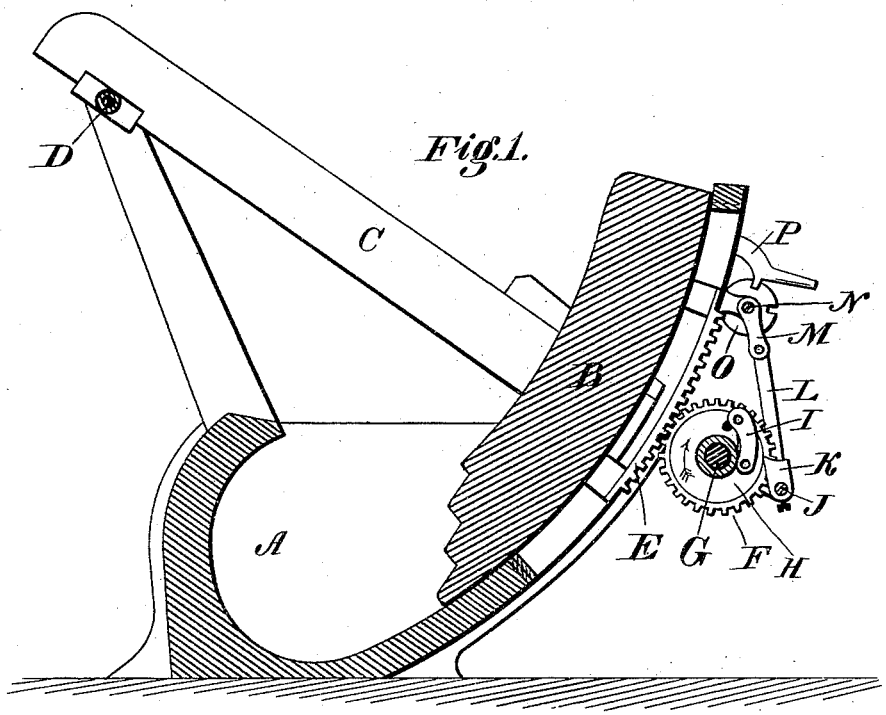
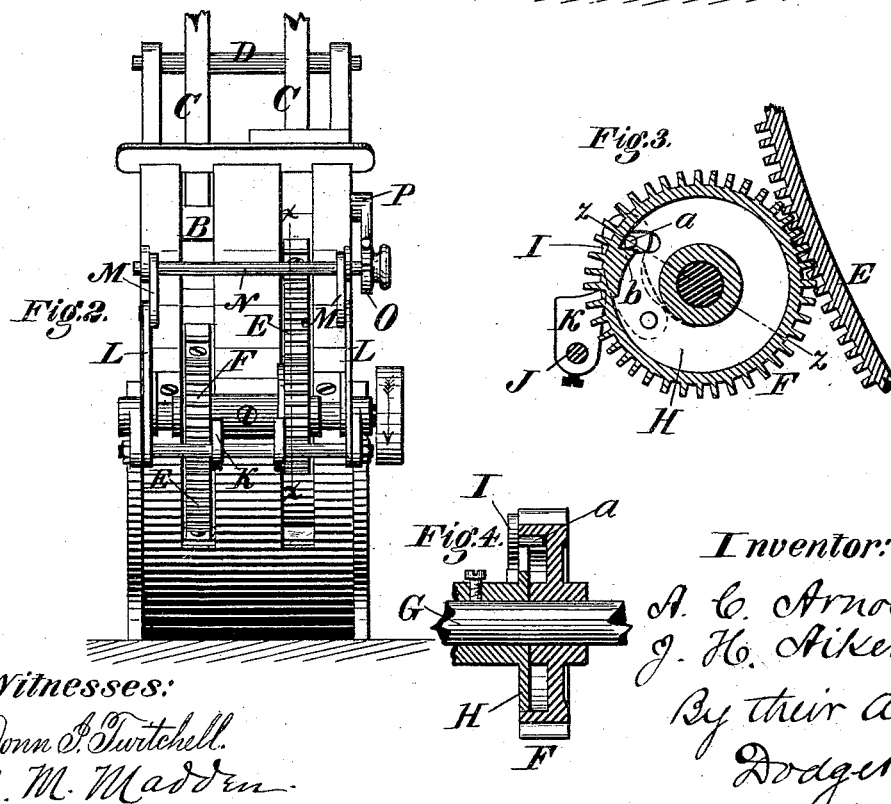

UNITED STATES PATENT OFFICE.

ALONZO C. ARNOLD AND JOHN H. AIKEN, OF NORWALK, CONNECTICUT.

IMPROVEMENT IN FULLING-MILLS.

Specification forming part of Letters Patent No. 209,152, dated October 22, 1878; application filed March 18, 1878.

*To all whom it may concern:*

Be it known that we, ALONZO C. ARNOLD and JOHN H. AIKEN, of Norwalk, in the county of Fairfield and State of Connecticut, have invented certain Improvements in Fulling-Mills, of which the following is a specification:

This invention relates to an improvement in the ordinary class of fulling-mills, in which falling beaters or hammers are employed.

The improvement consists in the peculiar arrangement of mechanism for raising and then releasing the beaters, the arrangement being extremely simple in construction, positive in action, and permitting the height to which the beaters are raised to be increased or diminished at will, as hereinafter more fully described.

Figure 1 represents a vertical central section of my improved machine; Fig. 2, a rear elevation of the same, showing the two beaters and their operating mechanism; Fig. 3, a vertical section on the line $x\ x$ of Fig. 2; Fig. 4, a cross-section on the line $z\ z$ of Fig. 3.

The drawings represent a machine having two independent hammers or heads; but our improvements may be applied to machines having any desired number of independent heads.

A represents the vat or tub; B, the beaters or hammers, each of the latter being attached to an arm, C, pivoted at its upper end to a fixed transverse shaft, D, in the same or substantially the same manner as in the mills now in common use. To the rear outer side of each of the beaters B we secure a segmental rack-bar, E, and in suitable fixed bearings behind the beaters we mount a transverse driving-shaft, G, carrying the pinions F, which latter are arranged to gear one into each of the rack-bars E, as shown in Figs. 1, 2, and 3. These pinions are mounted loosely upon the shaft G, and are each recessed on one side to receive an annular hub or disk, H, secured firmly upon the shaft, as shown in Fig. 4.

Upon each hub or disk there is pivoted a dog, I, having an arm, $a$, which extends inward into an annular space within the pinion, which latter is provided in said space with a tooth, $b$, to engage with the arm on the dog, as shown in Figs. 3 and 4, the dog thus serving to lock the hub and pinion together, in order that the pinion acting upon the rack may raise the head or beater. The driving-shaft G receives a continuous rotary motion in one direction, and hence it is necessary that the dog shall disengage at the proper time from the tooth $b$, in order that the pinion may run backward to permit the falling of the beater. This release of the dogs is effected by mounting in suitable bearings a transverse shaft, J, and securing thereon arms or tripping-blocks K, as shown in Figs. 1, 2, and 3, the blocks being so arranged that the dogs come in contact with and are disengaged by them at the moment the heads B reach the required elevation.

The operation is as follows: As the shaft turns the disks or hubs forward in the direction indicated by the arrow, the dog engaging with the tooth of the pinion turns the same forward and causes it to lift the head or beater until the movable end of the dog rides against the arm or tripper K, which causes the dog to disengage from the pinion, thus releasing the pinion from the hub and permitting the beater to fall by reason of its gravity. The descent of the beater and rack causes the pinion to turn backward in the direction opposite to that in which the shaft rotates. As the shaft and hub continue their rotation the dog again engages with the pinion, the beater is again raised and released, as before, and so on repeatedly and continuously.

For the purpose of enabling the attendant to vary the height to which the beaters are raised at will, the arms or tripping devices K have their supporting-shaft mounted on arms journaled upon or concentric with the driving-shaft G, so that the arms K may be raised or lowered, and thus caused to trip the dogs sooner or later, as required.

For the purpose of adjusting and holding the tripping devices or arms K, their supporting-shaft is connected by links L to arms M on a rock-shaft, N, which latter is mounted in fixed bearings, and provided at its end with a crank or hand-wheel, by which to turn it, and also with a notched disk, O, to receive a pivoted locking-dog, P, as shown in Figs. 1 and 2. In order to vary the height to which the beaters are raised, it is only necessary to lift the dog P, turn the shaft N until the tripping devices are adjusted to the desired point, and then lock the dog into the plate, as before described, so as to hold the parts in position.

In the machine shown in the drawing, having the two beaters, the parts are so arranged in relation to each other that one pinion begins to lift the corresponding head at the same instant that the other head is released and commences its descent. By thus arranging the parts so as to lift the two heads alternately and in immediate succession, we secure a constant and rapid action of the machine, and bring a constant and uniform resistance upon the driving-shaft, so that a smooth and regular action of the parts is secured.

The essential feature of our invention is the elevating of the beaters by means of pinions, connected to a continuously-rotating shaft by means of dogs or coupling devices, which are automatically thrown into and out of action at proper intervals to effect the elevation and release of the beaters.

It is manifest that the peculiar form and arrangement of the dogs and the devices for causing their disengagement, and also the mechanism for adjusting the tripping devices, may be varied in many respects, which will at once suggest themselves to the skilled mechanic. For example, the pinion or pulley may be made without teeth, and arranged to wind up a cord or an endless chain attached to the head or beater.

The principal advantages resulting from our construction are great cheapness and simplicity, a positive action of all the parts, the adaptation of the machine to be run at much higher speed than those of ordinary construction, and the great convenience in regulating the fall of the beaters.

Having thus described our invention, what we claim is—

1. The combination of a beater provided with a rack, a pinion gearing into said rack and mounted loosely on a driving-shaft, devices for locking the pinion to the shaft, and tripping devices for automatically releasing the pinion when the beater has reached the proper elevation.

2. In combination with a gravitating head or beater, a pinion or pulley, operating to elevate the same, mounted loosely on a driving-shaft, and tripping devices for automatically releasing the pinion when the beater has reached the proper elevation.

3. The combination, with a continually-rotating shaft, G, provided with the hub H and pivoted dog I thereon, the loose pinion F, rack E, and tripping device K.

4. In combination with the dog I, arranged as and for the purpose described, the arm or tripping device K, adjustable about an axis around which the dog revolves, in combination with the shaft J and dogs K, the rock-shaft N, arms M, link L, and locking devices O P.

ALONZO C. ARNOLD.
JOHN H. AIKEN.

Witnesses:
W. E. MONTGOMERY,
GEO. E. MILLER.